(12) United States Patent
Nakanishi

(10) Patent No.: US 8,871,395 B2
(45) Date of Patent: Oct. 28, 2014

(54) AIR BATTERY SYSTEM

(75) Inventor: Shinji Nakanishi, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1197 days.

(21) Appl. No.: 12/531,078

(22) PCT Filed: Apr. 21, 2008

(86) PCT No.: PCT/JP2008/057690
§ 371 (c)(1),
(2), (4) Date: Feb. 24, 2010

(87) PCT Pub. No.: WO2008/136296
PCT Pub. Date: Nov. 13, 2008

(65) Prior Publication Data
US 2010/0151336 A1    Jun. 17, 2010

(30) Foreign Application Priority Data

May 1, 2007  (JP) ................................. 2007-121085
Jul. 24, 2007  (JP) ................................. 2007-192469

(51) Int. Cl.
*H01M 8/06* (2006.01)
*H01M 2/00* (2006.01)
(Continued)

(52) U.S. Cl.
CPC .............. *H01M 12/06* (2013.01); *H01M 10/34* (2013.01); *H01M 12/04* (2013.01);
(Continued)

(58) Field of Classification Search
CPC . H01M 8/02; H01M 2004/024; H01M 12/06; H01M 12/065; H01M 4/8605; H01M 2/0275; H01M 2/0287; H01M 2/38; H01M 2/385; H01M 2/40; H01M 8/0241; H01M 8/0247; H01M 8/0258–8/0265; H01M 8/0271; H01M 2008/1095; H01M 12/04; H01M 12/08; Y02E 60/50; Y02E 60/128
USPC .................. 429/402–403, 50, 63, 34, 38, 39, 429/456–457, 463, 512, 514, 482, 407–408
See application file for complete search history.

(56) References Cited

U.S. PATENT DOCUMENTS 5,011,747 A * 4/1991 Strong et al. ................... 429/407
5,185,218 A    2/1993 Brokman et al.
(Continued)

FOREIGN PATENT DOCUMENTS

EP    2 203 949    7/2010
FR    1 545 236    11/1968
(Continued)

OTHER PUBLICATIONS

Extended European Search Report for EP Appl. No. 08740732.6 dated Oct. 19, 2012.

*Primary Examiner* — Barbara Gilliam
*Assistant Examiner* — Claire L Roe
(74) *Attorney, Agent, or Firm* — Finnegan, Henderson, Farabow, Garrett & Dunner, LLP

(57) ABSTRACT

An air battery system may include an air battery cell containing an air cathode, an anode, a separator, and an oxygen gas supply for supplying an oxygen gas by bubbling to a liquid electrolyte. The air cathode may include an air cathode layer containing a conductive material, and an air cathode current collector for collecting current of the air cathode layer. The anode may include an anode layer containing an anode active material which stores and releases a metal ion, and an anode current collector for collecting current of the anode layer. The separator may be provided between the air cathode layer and the anode layer, wherein the air cathode layer and the anode layer may be constantly filled with the liquid electrolyte at a time of a change in a volume of the electrode caused by a discharge or a discharge and charge.

5 Claims, 4 Drawing Sheets

(51) Int. Cl.
  *H01M 12/04* (2006.01)
  *H01M 6/14* (2006.01)
  *H01M 10/42* (2006.01)
  *H01M 12/02* (2006.01)
  *H01M 6/50* (2006.01)
  *H01M 12/08* (2006.01)
  *H01M 10/052* (2010.01)
  *H01M 8/04* (2006.01)
  *H01M 12/06* (2006.01)
  *H01M 10/34* (2006.01)
  *H01M 10/52* (2006.01)

(52) U.S. Cl.
  CPC ............ H01M 6/14 (2013.01); H01M 10/4214 (2013.01); *Y02E 60/50* (2013.01); H01M 12/02 (2013.01); H01M 6/5077 (2013.01); H01M 12/08 (2013.01); H01M 10/052 (2013.01); *Y02E 60/128* (2013.01); *Y02E 60/122* (2013.01); H01M 8/04119 (2013.01); H01M 10/4242 (2013.01); *H01M 12/065* (2013.01); *H01M 10/52* (2013.01)

USPC .............................................. 429/408; 429/63

(56) References Cited

U.S. PATENT DOCUMENTS

| | | | | |
|---|---|---|---|---|
| 5,645,952 | A | * | 7/1997 | Lampinen et al. ............ 429/410 |
| 6,596,431 | B1 | * | 7/2003 | Sotomura et al. ............... 429/50 |
| 2004/0241537 | A1 | * | 12/2004 | Okuyama et al. ............... 429/86 |

FOREIGN PATENT DOCUMENTS

| | | |
|---|---|---|
| JP | 1-159973 | 6/1989 |
| JP | 4-154054 | 5/1992 |
| JP | 4-154055 | 5/1992 |
| JP | 2002-516474 | 6/2002 |
| JP | 2003-7357 | 1/2003 |
| JP | 3515492 | 1/2004 |
| JP | 2004-119278 | 4/2004 |
| JP | 2005-026023 | 1/2005 |
| JP | 3764623 | 1/2006 |

* cited by examiner

AIR BATTERY SYSTEM

CROSS-REFERENCE TO RELATED APPLICATIONS

This application is a national phase application of International Application No. PCT/JP2008/057690, filed Apr. 21, 2008, and claims the priority of Japanese Application Nos. 2007-121085, filed May 1, 2007, and 2007-192469, filed Jul. 24, 2007, the contents of all of which are incorporated herein by reference.

TECHNICAL FIELD

The present invention relates to an air battery system which can restrain the internal resistance caused by the shortage of liquid electrolyte from increasing and which can carry out a high-rate discharge.

BACKGROUND ART

The air battery is a nonaqueous battery using air (oxygen) as a cathode active material, and has advantages such as having a high energy density, and facilitating downsizing and weight saving. In such an air battery, when a metal Li is used for an anode active material for example, the following reactions (1) to (4) are mainly generated.
[Chemical Formula 1]
Discharge Time $$\text{ANODE: } 2Li \rightarrow 2Li^+ + 2e^- \quad (1)$$

$$\text{AIR CATHODE: } 2Li^+ + 2e^- + O_2 \rightarrow Li_2O_2 \quad (2)$$

A little amount of $Li_2O$ may sometimes be generated other than $Li_2O_2$.
Charge Time $$\text{ANODE: } 2Li^+ + 2e^- \rightarrow 2Li \quad (3)$$

$$\text{AIR CATHODE: } Li_2O_2 \rightarrow 2Li^+ + 2e^- + O_2 \quad (4)$$

Various researches have been conducted conventionally in order to maximize the advantages of air batteries. For example, Patent Document 1 discloses a nonaqueous electrolyte air battery using a specific ambient temperature molten salt as a nonaqueous electrolyte. This air battery is to prevent the volatilization of a solvent by using the specific ambient temperature molten salt, and thereby improves discharged capacity at high temperature and the discharged capacity after being stored under a high humidity. Patent Document 2 discloses a nonaqueous electrolyte battery comprising a cathode which uses a carbonaceous substance having a specific porous capacity. This focuses on the specific porous capacity of the carbonaceous substance and the like and intends to increase the high capacity of the battery. Accordingly, approaches to improve functionality of constitutional member of a battery have been the main stream of the conventional researches.

However, the air battery has a problem that the volume of electrodes (air cathode and anode) changes significantly according to a discharge or a discharge and charge, which causes a shortage of liquid electrolyte. To specifically explain the above-mentioned reaction, at the time of discharge, Li elutes out as a Li ion at the anode (reaction (1)), and lithium oxide is precipitated at the air cathode (reaction (2)). At this time, since a degree in density of lithium oxide ($Li_2O_2$) is larger than that of Li, a shrinkage of 35% in volume ratio as the whole electrodes is caused. As a result, there has been a problem of increasing the internal resistance caused by a part of air cathode and the like not soaking into the liquid electrolyte because of a shortage in the liquid electrolyte amount occurred at end phase of the discharge. Further, when a carbon material such as graphite is used as an anode active material other than a metal Li, a volume change at an anode is less, but $Li_2O_2$ is generated at an air cathode and a liquid electrolyte in the air cathode is pushed out. Consequently, the liquid electrolyte is transferred to a gap or the like in the battery, and the liquid electrolyte is less likely to transfer back to the air cathode after the dissolution of $Li_2O_2$ caused at the charge. As a result, the shortage in the liquid electrolyte amount is caused and a problem of increasing an internal resistance is caused. Therefore, an air battery which can restrain the internal resistance caused by the shortage of liquid electrolyte from increasing has been called for.

On the other hand, an encapsulated type air battery in which a gas such as oxygen is sealed in the battery case has been known. For example, Patent Document 3 discloses an encapsulated type oxide-lithium secondary battery, wherein the gas including pressured oxygen is sealed in an exterior part of the air battery. This is to restrain the intrusion of moisture in air to the battery by making the oxide-lithium secondary battery as an encapsulated type, and thereby to improve the storage properties of the battery or the cycle life of discharge and charge. Nonetheless, such oxide-lithium secondary battery has the following problems.

As shown in the above-illustrated reaction (2), an air cathode needs oxygen and the density of oxygen dissolved in a liquid electrolyte decreases by the reaction at a discharge. In case of the above-mentioned oxygen-lithium secondary battery, there has been a problem in maintaining the density of dissolved oxygen high and the high-rate discharge has been difficult to carry out. In the above-mentioned oxygen-lithium secondary battery, the pressured oxygen is sealed therein. Thus, the oxygen is more likely to dissolve in the liquid electrolyte compare to the case when no pressure is applied to the oxygen. Nonetheless, it has been difficult sometimes, in this method of using the pressure, to dissolve a sufficient amount of oxygen at short time.

As the other problem, there has been a difficulty in carrying out a high-rate charge when the pressured oxygen is sealed inside a battery case. As shown in the above-illustrated reaction (4), an air cathode generates oxygen at a charge. When the pressured oxygen is sealed inside a battery case, the partial pressure inside the battery case remains high, the above-illustrated reaction (4) is less likely to be caused, so that the a high-rate charge becomes difficult to carry out.

Patent Document 4 discloses a metal/oxygen battery, wherein oxygen is condensed by an oxygen condenser, and the battery comprises a means to supply the high-purity oxygen to an anode. This intends to increase a high power by supplying the condensed oxygen according to an output current. Further, Patent Document 5 discloses a nonaqueous electrolyte air battery comprising a nonaqueous liquid electrolyte in which a carbon dioxide is dissolved (claim 3). This intends to restrain a direct oxidation of an anode by dissolving carbon dioxide into the nonaqueous liquid electrolyte and thereby to improve cycle properties.

Patent Document 1: Japanese Patent Application Publication (JP-A) No. 2004-119278
Patent Document 2: Japanese Patent No. 3,515,492
Patent Document 3: Japanese Patent No. 3,764,623
Patent Document 4: JP-A No. 2002-516474
Patent Document 5: JP-A No. 2003-7357

DISCLOSURE OF THE INVENTION

Problems to be Solved by the Invention

The present invention is achieved in view of the above-mentioned situation, and a main object thereof is to provide an air battery system which can restrain the internal resistance caused by the shortage of liquid electrolyte from increasing and which can carry out the high-rate discharge.

Means for Solving the Problems

To solve the above-mentioned problems, the present invention provides an air battery system comprising: an air battery cell which contains an air cathode, an anode, and a separator; and an oxygen gas supply means for supplying an oxygen gas by bubbling to a liquid electrolyte, characterized in that the air cathode further contains an air cathode layer containing a conductive material, and an air cathode current collector for collecting current of the air cathode layer; the anode further contains an anode layer containing an anode active material which stores and releases a metal ion, and an anode current collector for collecting current of the anode layer; and the separator is provided between the air cathode layer and the anode layer, and characterized in that the air cathode layer and the anode layer are constantly filled with the liquid electrolyte at a time of a change in a volume of the electrode caused by a discharge or a discharge and charge.

According to the present invention, since the oxygen gas is directly supplied by bubbling to the liquid electrolyte, it is possible to rapidly increase a density of dissolved oxygen in the liquid electrolyte even when the density of the dissolved oxygen in the liquid electrolyte is decreased by the discharge reaction. Thereby, high-rate discharge can be carried out. Further, since the air cathode layer and the anode layer are constantly filled with the liquid electrolyte, it is possible to restrain the internal resistance caused by the shortage of liquid electrolyte from increasing.

In the present invention, the air battery cell is preferably an air battery cell whose air cathode layer and anode layer are constantly filled with the liquid electrolyte by circulating the liquid electrolyte. By circulating the liquid electrolyte, it is possible to carryout a discharge and charge without causing an air-liquid interface between the liquid electrolyte and the air, which is caused when a conventional air battery cell is used. It is also possible to constantly fill the air cathode layer and the anode layer with the liquid electrolyte even when a change in a volume of the electrode caused by a discharge or a discharge and charge is caused.

Further in the present invention, the oxygen gas supply means is preferably provided in a circulating zone for circulating the liquid electrolyte. By providing the oxygen gas supply means outside of the air battery cell, it is possible to downsize the air battery cell.

In addition, in the present invention, when a height of a liquid level of the liquid electrolyte changes by the change in a volume of the electrode caused by the discharge or the discharge and charge, a position of a lowest liquid level of the liquid electrolyte is preferably higher than a position of a top surface of the air cathode layer and the anode layer. By setting the amount of the liquid electrolyte to the above-mentioned position, it is possible to prevent the shortage of liquid electrolyte.

Still further, in the above-mentioned invention, the air battery system further preferably has an inert gas supply means for supplying an inert gas by bubbling to the liquid electrolyte in the air battery cell. Thereby, it is possible to lower a density of dissolved oxygen in the liquid electrolyte even when the density of dissolved oxygen in the liquid electrolyte is increased by the charging reaction. As a result, the high-rate charge can be carried out.

In addition, the present invention provides a control method of an air battery cell using an air battery cell which contains an air cathode, an anode, and a separator, characterized in that the air cathode further contains an air cathode layer containing a conductive material, and an air cathode current collector for collecting current of the air cathode layer; the anode further contains an anode layer containing an anode active material which stores and releases a metal ion, and an anode current collector for collecting current of the anode layer; and the separator is provided between the air cathode layer and the anode layer, and characterized in that the air cathode layer and the anode layer are constantly filled with a liquid electrolyte at a time of a change in a volume of the electrode caused by a discharge or a discharge and charge, and further characterized in that an oxygen gas is supplied by bubbling to the liquid electrolyte at the discharge.

According to the present invention, since the oxygen gas is directly supplied by bubbling to the liquid electrolyte, it is possible to rapidly increase a density of dissolved oxygen in the liquid electrolyte. Thereby, high-rate discharge can be carried out.

In the above-mentioned invention, it is preferable to supply an inert gas by bubbling to the liquid electrolyte at the charge. Thereby, it is possible to lower a density of dissolved oxygen in the liquid electrolyte even when the density of dissolved oxygen in the liquid electrolyte is increased by the charging reaction. As a result, the high-rate charge can be carried out.

Effects of the Present Invention

The present invention attains an effect of providing an air battery system which can restrain the internal resistance caused by the shortage of liquid electrolyte from increasing and which can carry out a high-rate discharge.

EXPLANATION OF REFERENCES

Figure 1A:
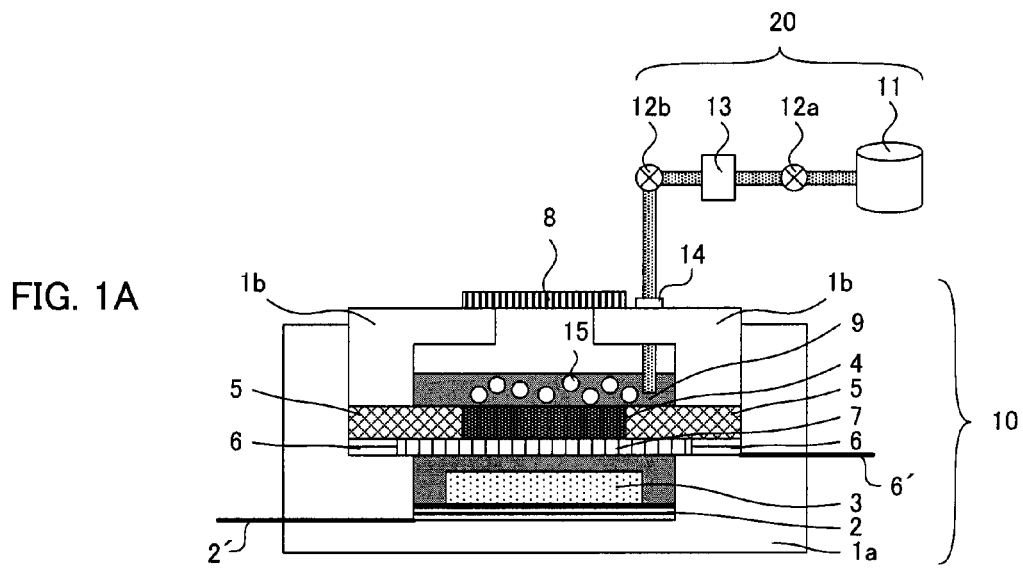
FIGS. 1A to 1C are each an explanatory view describing one embodiment of the air battery system of the present invention.

1 . . . Battery case
1a . . . Lower insulating case
1b . . . Upper insulating case
2 . . . Anode current collector
2' . . . Anode lead
3 . . . Anode layer 4 ... Air cathode layer
5 ... Air cathode mesh
6 ... Air cathode current collector
6' ... Air cathode lead
7 ... Separator
8 ... Microporous membrane
9 ... Liquid electrolyte

BEST MODE FOR CARRYING OUT THE INVENTION

Hereinafter, an air battery system and a control method of an air battery cell of the present invention will be explained in detail.

A. Air Battery System

First, an air battery system of the present invention will be explained. The air battery system of the present invention comprises: an air battery cell which contains an air cathode, an anode, and a separator; and an oxygen gas supply means for supplying an oxygen gas by bubbling to a liquid electrolyte, characterized in that the air cathode further contains an air cathode layer containing a conductive material, and an air cathode current collector for collecting current of the air cathode layer; the anode further contains an anode layer containing an anode active material which stores and releases a metal ion, and an anode current collector for collecting current of the anode layer; and the separator is provided between the air cathode layer and the anode layer, and characterized in that the air cathode layer and the anode layer are constantly filled with the liquid electrolyte at a time of a change in a volume of the electrode caused by a discharge or a discharge and charge.

According to the present invention, the oxygen gas is directly supplied by bubbling to the liquid electrolyte. Thereby, it is possible to rapidly increase a density of dissolved oxygen in the liquid electrolyte even when the density of dissolved oxygen in the liquid electrolyte is decreased by the discharging reaction. As a result, the high-rate discharge can be carried out. As explained above, although a method of sealing the pressured oxygen in a battery case has been known, there has been sometimes a difficulty in dissolving a sufficient amount of oxygen at short time in this method of using the pressure. On the other hand, it is possible in the present invention to actively dissolve the oxygen by bubbling so that the high-rate discharge can be carried out.

Further, in the present invention, since the air cathode layer and the anode layer are constantly filled with the liquid electrolyte, it is possible to restrain the internal resistance caused by the shortage of liquid electrolyte from increasing. Still further, although it is conventionally known that the air cathode layer and the anode layer are temporarily filled with the liquid electrolyte (for example, paragraph [0070] of the Patent Document 1), the method of constantly filling the air cathode layer and the anode layer with the liquid electrolyte is not known at all. In the present invention, by constantly filling the air cathode layer and the anode layer with the liquid electrolyte, it is possible to restrain the internal resistance caused by the shortage of liquid electrolyte from increasing and to obtain a higher performance air battery system.

Moreover, as explained, the air cathode layer and the anode layer are constantly filled with the liquid electrolyte. Accordingly, the oxygen used in the discharging reaction can be substantially all regarded as a dissolved oxygen dissolved into the liquid electrolyte. As such, in an air battery system using such an air battery cell, a decrease in density of the dissolved oxygen can be regarded as the major factor to cause a decrease in the discharge efficiency. In the present invention, such decrease in density of the dissolved oxygen is prevented by a means of directly bubbling oxygen in to the liquid electrolyte, and thereby, an air battery system which can carryout a high-rate discharge is obtained.

For example, when the air battery system of the present invention is a secondary battery system, normally, an oxygen gas is supplied at a discharge, and an oxygen gas is not supplied or an inert gas to be explained later will be supplied at a charge. By controlling the supply of an oxygen gas or the like accordingly, it is possible to carry out an optimal discharge/charge.

Figure 1B:
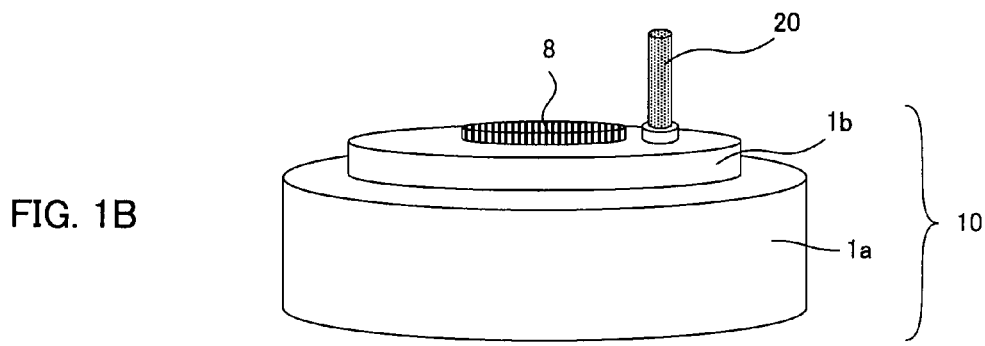

Next, the air battery system of the present invention will be explained with reference to the drawings. FIG. 1A is a schematic cross-sectional view illustrating an example of the air battery system of the present invention. FIG. 1B is a diagrammatic perspective view illustrating the appearance of the air battery cell shown in FIG. 1A. The air battery system shown in FIG. 1A comprises an air battery cell 10 and an oxygen gas supply means 20. The air battery cell 10 comprises: an air cathode current collector 2 formed at the base surface of a lower insulating case 1a; an anode lead 2' connected to an air cathode current collector 2; an anode layer 3 formed on the air cathode current collector 2 and made of metal Li; an air cathode layer 4 containing carbons; an air cathode mesh 5 and an air cathode current collector 6 collecting current of the air cathode layer 4; an air cathode lead 6' connected to an air cathode current collector 6; a separator 7 provided between the anode layer 3 and the air cathode layer 4; an upper insulating case 1b comprising a microporous membrane 8; and a liquid electrolyte 9 for immersing the anode layer 3 and the air cathode layer 4. Further, the oxygen gas supply means 20 comprises an oxygen gas storage part 11, a solenoid valve 12a, a pressure pump 13, a solenoid valve 12b, and a fixing screw 14, and the means is for bubbling the liquid electrolyte in the air battery cell 10 with an oxygen gas 15.

Figure 1C:
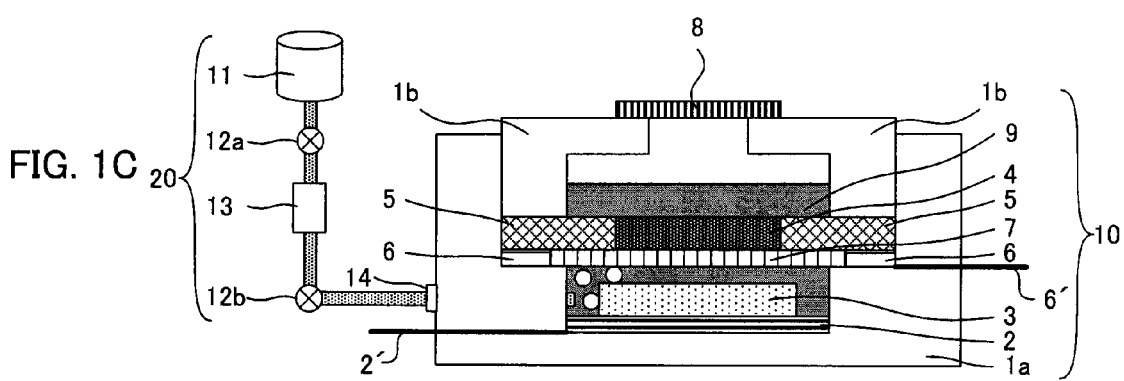
Figure 2:
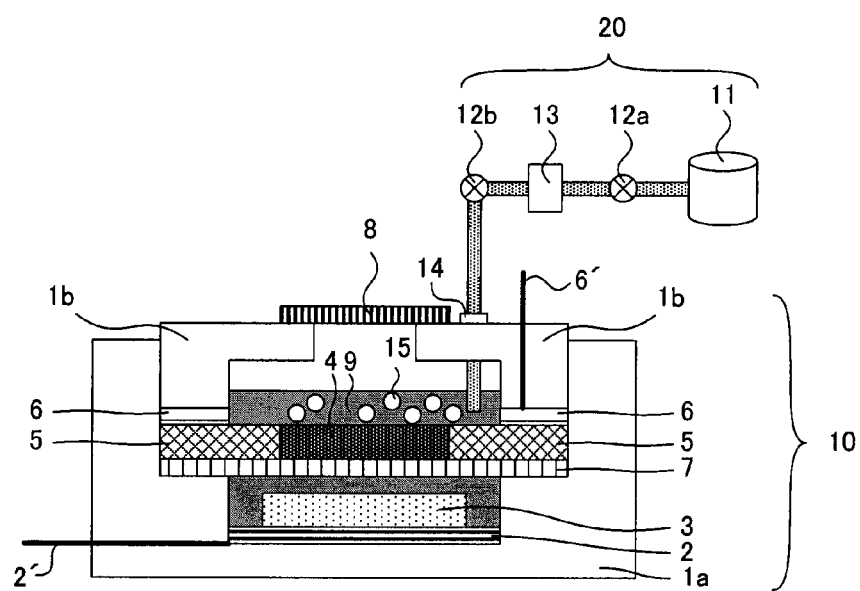
FIG. 2 is an explanatory view describing one embodiment of the air battery system of the present invention.

Further, the air battery system of the present invention may have the oxygen gas supply means 20 carry out the bubbling from the anode layer 3 side as shown in FIG. 1C. The air battery cells 10 illustrated in FIGS. 1A to 1C are open type, but the air battery cell used in the present invention may be an open type or an encapsulated type as explained later. Still further, the air battery of the present invention may have an air cathode current collector 6 attached at the tip of the upper insulating case 1b as shown in FIG. 2.

Figure 3A:
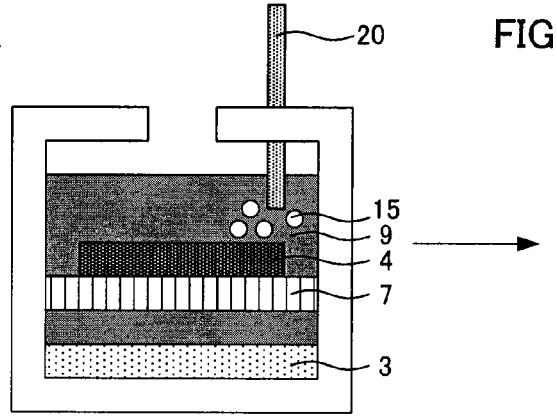
FIGS. 3A and 3B are each an explanatory view describing one embodiment of the air battery system of the present invention.
Figure 3B:
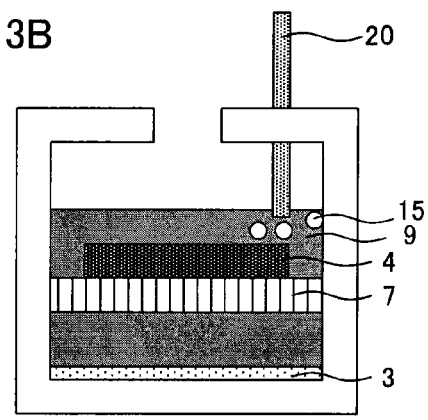

FIGS. 3A and 3B are each a schematic cross-sectional view illustrating the simplified air battery cell shown in FIG. 1A. For convenience sake, an air cathode current collector and an anode current collector are omitted from the drawings. In FIGS. 3A and 3B, air battery cells have sufficiently amount of liquid electrolytes 9 (FIG. 3A). Thus, for example, even when the metal Li of an anode layer 3 elutes out at a discharge, a volume of the electrode decreases, and a liquid level of the liquid electrolyte 9 lowers as a result, it is possible to maintain the position of the lowest liquid level higher than the position of the top surface of an air cathode layer 4 (FIG. 3B). Thereby, an air cathode layer 4 is constantly filled with the liquid electrolyte 9, and the internal resistance caused by the shortage of liquid electrolyte can be restrained. Further, the oxygen dissolved in the liquid electrolyte is used for the reaction at a discharge. In the present invention, since the oxygen gas 15 is fully supplied by the oxygen gas supply means 20, a high-rate discharge can be carried out.

In the present invention, the phrase "change in a volume of the electrode caused by a discharge or a discharge and charge" denotes a change in volume of electrodes (air cathode and anode) caused by a difference in the density of the generated substance or the like when a metal ion transfers between an air cathode layer and an anode layer according to a discharge or a discharge and charge. When an air battery cell used in the present invention is a primary battery, a volume change of an electrode associated to a "discharge" is concerned, and when an air battery cell is a secondary battery, a volume change of an electrode associated to a "discharge and charge" is concerned. For example, when a metal Li is used as an anode active material, a reaction of eluting the metal Li at the anode layer is generated (reaction (1)), and a reaction of generating lithium oxide ($Li_2O_2$) is caused at the air cathode layer (reaction (2)) at the time of a discharge. At this time, since a degree in density of lithium oxide ($Li_2O_2$) is larger than that of a metal Li, the respective volumes of the electrodes (air cathode layer and anode layer) decrease. When such change in a volume of the electrodes is caused, the air cathode layer and the anode layer are constantly filled with the liquid electrolyte in the air battery cell used in the present invention.

Hereinafter, the air battery system of the present invention will be explained by the perspectives of materials of the air battery system and structure of the air battery system.

1. Materials of Air Battery System

First, materials of the air battery system of the present invention will be explained. The air battery system of the present invention comprises at least an air battery cell and an oxygen gas supply means. Further, the air battery system may comprise an inert gas supply means as needed. Hereinafter, the materials of the air battery system of the present invention will be explained by the perspectives of (1) Air Battery Cell, (2) Oxygen Gas Supply Means, and (3) Inert Gas Supply Means.

(1) Air Battery Cell

First, an air battery cell used in the present invention will be explained. The air battery cell used in the present invention normally comprises an air cathode, an anode, a separator, a liquid electrolyte, and a battery case.

(i) Air Cathode

An air cathode used in the present invention contains an air cathode layer containing a conductive material and an air cathode current collector for collecting current of the air cathode layer. In the present invention, oxygen dissolved in a liquid electrolyte reacts with a metal ion in the air cathode and a metal oxide is generated to the surface of the conductive material. Thus, the air cathode layer has a gap to the extent that the liquid electrolyte, which is a carrier of oxygen and the metal ion, can sufficiently transfers.

The conductive material is not particularly limited as long as the material has conductivity. For example, a carbon material can be cited. Further, the carbon material may or may not have a porous structure. In the present invention, a material having a porous structure is preferable. This is because a porous structure has a large specific surface and thereby capable of providing many reaction fields. As a specific example of a carbon material having a porous structure, a mesoporous carbon can be cited. As specific examples of a carbon material not having a porous structure, graphite, acetylene black, a carbon nanotube, and a carbon fiber can be cited. Moreover, the conductive material may have a supported catalyst. As examples of the catalyst, cobalt phthalocyanine and manganese dioxide can be cited.

In the present invention, the air cathode layer is sufficient if it contains at least the conductive material, but preferably contains a binding agent to fix the conductive material. As examples of the binding agent, polyvinylidene-fluoride (PVdF), and polytetrafluoroethane (PTFE) can be cited. An amount of the binding agent contained in the air cathode layer is not particularly limited, but for example, it is preferably 30% by weight or lower, and particularly preferably within the range of 1% by weight to 10% by weight.

A material for the air cathode current collector is not particularly limited as long as the material has conductivity. For example, stainless, nickel, aluminium, iron, and titanium can be cited. As examples of a shape of the air cathode current collector, a foil form, a plate form, and a mesh (grid) form can be cited. Among them, the air cathode current collector is preferably a mesh form in the present invention, because it is excellent in current collection efficiency. In such case, the air cathode current collector in mesh form is provided in the air cathode layer. Further, the air battery cell may have another air cathode current collector (for example, a current collector in foil form) which collects charges collected by the air cathode current collector in the mesh form. Moreover, in the present invention, the battery case to be explained later may also have a function of the air cathode current collector.

(ii) Anode

An anode used in the present invention contains an anode layer containing an anode active material which stores and releases a metal ion, and an anode current collector for collecting current of the anode layer.

The anode active material is not particularly limited as long as it can stores and releases a metal ion. A kind of the metal ion is not particularly limited as long as the ion transfers between the air cathode and the anode and generates electromotive force. As specific examples, a lithium ion, a sodium ion, an aluminium ion, a magnesium ion, and a cesium ion can be cited. Among them, a lithium ion is preferable.

As for the anode active material which stores and releases a lithium ion, an anode active material used for a general lithium ion battery can be used. As specific examples, metal lithium, a lithium alloy, metal oxide, metal sulfide, metal nitride, and carbon materials such as graphite can be cited. Among them, metal lithium and carbon materials, and particularly metal lithium is preferable. This is because, as explained in the above-mentioned reaction (1), metal lithium elutes as a lithium ion at a discharge and it has a large volume change.

In the present invention, the anode layer may be sufficient if it contain at least an anode active material, but may contain a binding agent for fixing the anode active material as needed. A kind and an amount to be used for the binding agent are the same as those explained in the above-mentioned "(i) Air Cathode", and thus, explanations here are omitted.

The anode current collector is not particularly limited as long as it has conductivity. For example, copper, stainless, and nickel can be cited. As examples of a shape of the anode current collector, a foil form, a plate form, and a mesh (grid) form can be cited. In the present invention, the battery case to be explained later may also have a function of the anode current collector.

(iii) Separator

A separator used in the present invention is provided between the air cathode layer and the anode layer. The separator is not particularly limited as long as it has functions to separate the air cathode layer and the anode layer, and to retain the liquid electrolyte. For example, porous films such as polyethylene and polypropylene, nonwoven fabrics such as resin nonwoven fabric and glass fiber nonwoven fabric, and polymer materials such as those used for a lithium polymer battery can be cited.

(iv) Liquid Electrolyte

A liquid electrolyte used in the present invention is generally prepared by dissolving an electrolyte to an organic solvent. As examples of the electrolyte, inorganic lithium salts such as $LiPF_6$, $LiBF_4$, $LiClO_4$, and $LiAsF_6$, and organic lithium salt such as $LiCF_3SO_3$, $LiN(CF_3SO_2)_2$, and $LiC(CF_3SO_2)_3$ can be cited.

The above-mentioned organic solvent is not particularly limited as long as it can dissolve the electrolyte, but a solvent which has high oxygen solubility is preferable. This is because the air cathode layer is constantly filled with the liquid electrolyte and the oxygen dissolved in the solvent is used for the reaction. As examples of the organic solvent, ethylene carbonate (EC), propylene carbonate (PC), dimethyl carbonate (DMC), diethyl carbonate (DEC), ethyl methyl carbonate (EMC), butylene carbonate, γ-butyrolactone, sulfolane, acetonitrile, 1,2-dimethoxymethane, 1,3-dimethoxypropane, diethyl ether, tetrahydrofuran, and 2-methyltetrahydrofuran can be cited. In particular, in the present invention, a mixed solvent combining EC or PC, and DEC or EMS is preferable. Further, in the present invention, a low-volatile liquid such as an ionic liquid can be used as the liquid electrolyte. This is because, by using a low-volatile liquid, it is possible to restrain a decrease in liquid electrolyte caused by volatilization so that the liquid can be used for longer time.

(v) Battery Case

A shape of the battery case used in the present invention is not particularly limited as long as it can store the above-mentioned air cathode, anode, separator, and liquid electrolyte. As specific examples, a coin type, a flat plate type, and a cylindrical type can be cited.

(2) Oxygen Gas Supply Means

Next, an oxygen gas supply means used in the present invention will be explained. The oxygen gas supply means used in the present invention is a means to supply an oxygen gas by bubbling to the liquid electrolyte. The oxygen gas supply means generally has a gas storage part for storing an oxygen gas, and a gas releasing part for releasing the oxygen gas. Further, the oxygen gas supply means may have other members such as a pressure pump, a solenoid valve, and a ball valve.

A gas releasing part for releasing an oxygen gas in the liquid electrolyte normally has a tube shape. An inner diameter of the tube-shape gas releasing part varies depending on factors such as a size of the air battery cell to which the gas releasing part is used. For example, it is preferably within the range of 1 mm to 13 mm, and particularly preferably within the range of 1 mm to 7 mm. A material for the gas releasing part is not particularly limited as long as it has a resistance to the liquid electrolyte and the like, and a general material such as a resin, a rubber and a metal can be used.

When the gas releasing part has a tube shape as explained, the oxygen gas is released from its tip and the bubbling is easily carried out. In particular, in the present invention, bubbles of the released oxygen gas are preferably fine. This is because, the fine bubbles increase the contact area to the liquid electrolyte and allow an effective increase in the density of the dissolved oxygen. From such point of view, the gas releasing part releasing the oxygen gas preferably has a bubble miniaturization means in the present invention.

The bubble miniaturization means is not particularly limited as long as oxygen gas bubbles of the desired size can be obtained. For example, a porous material having a bound porus, and a member having a slit-form opening part can be cited. As the porous material having a bound porus, a so-called bubbler or the like can be cited and fine bubbles are produced by the gas passing its porous part. Similarly, fine bubbles are produced by the gas passing the slit when the member having a slit-form opening part is used.

Further, as explained above, the finer the bubbles of oxygen gas generated are, it is more preferable. A diameter of a bubble of the oxygen gas is not particularly limited. For example, it is preferably 8 mm or smaller, and particularly preferably 1 mm or smaller.

In the present invention, a gas supplied by the oxygen gas supply means is not particularly limited as long as it contains an oxygen gas, and it maybe of only an oxygen gas, or be a mixed gas of an oxygen gas and the other gas. Using of only an oxygen gas is preferable from the view point of promoting a discharge reaction, and using of a mixed gas is preferable from the view point of controlling the reactivity of the discharge reaction or the view point of preventing the excessively high oxygen density.

As examples of the other gas used with the oxygen gas, a nitrogen gas, an argon gas, and a helium gas can be cited. From the view point of reactivity with a metal lithium, an argon gas and a helium gas is preferable, and an argon gas is more preferable. From the view point of cost reduction, a nitrogen gas is preferable. Further, a ratio of oxygen in the mixed gas is not particularly limited. For example, a ratio of 50% by volume or more is preferable, and 80% by volume or more is particularly preferable. The gas supplied by the oxygen gas supply means may be air. In such a case, it is preferable to use a dehydrating agent to prevent absorption of moisture, or to use a member such as a oxygen enrichment membrane to prevent permeance of carbon dioxide or the like.

(3) Inert Gas Supply Means

Next, an inert gas supply means used in the present invention will be explained. The air battery system of the present invention preferably has an inert gas supply means for supplying an inert gas by bubbling to the liquid electrolyte. By lowering a density of the dissolved oxygen, the oxygen is generated by an air cathode at a charge as shown in the above-mentioned reaction (4), the reaction (4) is smoothly promoted. As a result, it is possible to carry out a high-rate charge.

The inert gas supply means generally has a gas storage part for storing an inert gas, and a gas releasing part for releasing the inert gas. Further, the inert gas supply means may have other members such as a pressure pump, a solenoid valve, and a ball valve. Moreover, the gas releasing part from which the inert gas is released preferably has a bubble miniaturization means. Details of the above are the same to those explained in the above-mentioned section of "(2) Oxygen Gas Supply Means", and thus, explanations here are omitted.

The inert gas used in the present invention is not particularly limited as long as it does not adversely affect substantially other members such as the air cathode, the anode, and the liquid electrolyte. For example, a nitrogen gas, an argon gas, and a helium gas can be cited. From the view point of reactivity with a metal lithium, an argon gas and a helium gas is preferable, and an argon gas is more preferable. From a view point of cost reduction, a nitrogen gas is preferable. Further, in the present invention, the inert gas may be used by a single kind only or mixture of plural kinds.

2. Structure of Air Battery System

Next, a structure of an air battery system of the present invention will be explained. The air battery system of the present invention comprises at least an air battery cell and an oxygen gas supply means. Here, the air battery cell, one of the components of the air battery system of the present invention, has its air cathode layer and anode layer constantly filled with the liquid electrolyte at a time of a change in a volume of the electrode caused by a discharge or a discharge and charge, and has various structural embodiments explained later. In view of this, the structure of the air battery system of the present invention will be explained according to each structural embodiment of the air battery cell.

(1) Structure for Circulating Liquid Electrolyte

As one of the structures of the air battery cell of the present invention, a structure for circulating the liquid electrolyte can be cited. In other words, the air battery cell used in the present invention is preferably an air battery cell whose air cathode layer and anode layer are constantly filled with the liquid electrolyte by circulating the liquid electrolyte. By circulating the liquid electrolyte, it is possible to carry out a discharge and charge without causing an air-liquid interface between the liquid electrolyte and the air, which is caused when a conventional air battery cell is used. It is also possible to constantly fill the air cathode layer and the anode layer with the liquid electrolyte even when a change in a volume of the electrode caused by a discharge or a discharge and charge is caused. Further, it is possible to obtain an advantage of preventing the decrease in liquid electrolyte caused by volatilization. In addition, by not supplying the oxygen gas but by circulating the liquid electrolyte at the time of charging, it is possible to efficiently remove oxygen caused by the charging reaction from the air cathode layer.

Figure 4:
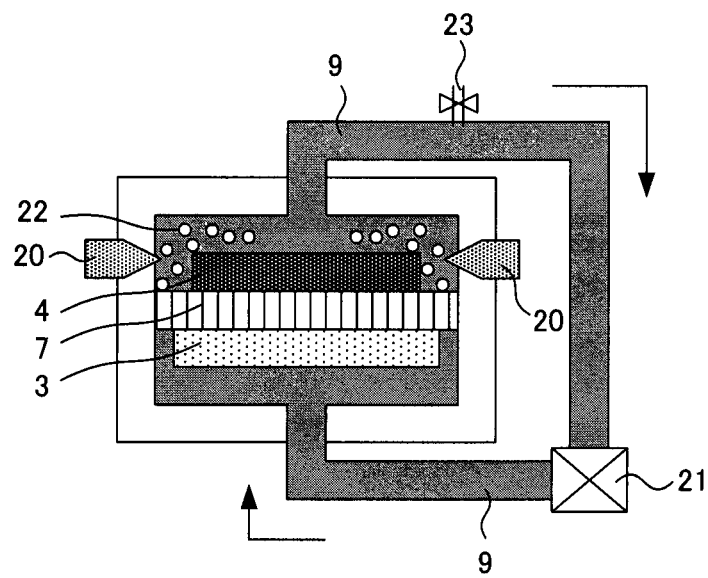
FIG. 4 is an explanatory view describing a means of circulating the liquid electrolyte.

As the specific example of the structure for circulating the liquid electrolyte, as shown in FIG. 4, a structure of circulating the liquid electrolyte 9 to an order of an anode layer 3, a separator 7, and an air cathode layer 4 using a liquid electrolyte transferring means 21 such as a motor can be cited. At a discharge, an oxygen gas 22 is supplied to the air cathode layer 4 using an oxygen gas supply means 20, and the excessive oxygen is removed by an exhausting means 23. The exhausting means 23 is not particularly needed if the oxygen gas supply means 20 can appropriately raise the oxygen density dissolved in a liquid electrolyte 9. Further, the liquid electrolyte may be circulated to a direction opposite to the direction of the liquid electrolyte illustrated in FIG. 4 at a time of a charge. In FIG. 4, an air cathode current collector and an anode current collector are omitted for convenience sake. Current may be collected in an appropriate method.

In other words, in the present invention, the air battery cell preferably further has a liquid electrolyte transferring means of circulating the liquid electrolyte. Further, the air battery cell preferably has an exhausting means to remove excess air.

(2) Structure of Using a Large Amount of Liquid Electrolyte

As a structure of the air battery cell used in the present invention, a structure of using a large amount of liquid electrolyte can be cited. As shown in FIGS. 3A and 3B, by using sufficiently large amount of liquid electrolyte 9, it is possible to prevent the air cathode layer 4 from having a shortage of liquid electrolyte, and to constantly filling the air cathode layer and the anode layer with the liquid electrolyte at a time of a change in a volume of the electrode caused by a discharge or a discharge and charge.

In other words, in the present invention, when a height of a liquid level of the liquid electrolyte changes by the change in a volume of the electrode caused by the discharge or the discharge and charge, a position of a lowest liquid level of the liquid electrolyte is preferably higher than a position of a top surface of the air cathode layer and the anode layer. By setting the amount of the liquid electrolyte to the above-mentioned position, it is possible to prevent the shortage of liquid electrolyte. For example, when a metal Li is used for the anode layer, a reaction of lithium elution is caused by the discharge and the whole volume of the electrode decreases. Accordingly, the liquid level of the liquid electrolyte at the time when the discharge is completed is regarded as the lowest liquid level position of the liquid electrolyte.

The phrase "top surface of the air cathode layer and the anode layer" denotes, depending on the structure of the air battery cell: a top surface of the air cathode layer, a top surface of the anode layer, and a top surface of the air cathode layer and the anode layer. Each cases will be explained with reference to FIGS. 5A to 5C. For convenience sake, an air cathode current collector and an anode current collector are omitted from the drawings.

Figure 5A:
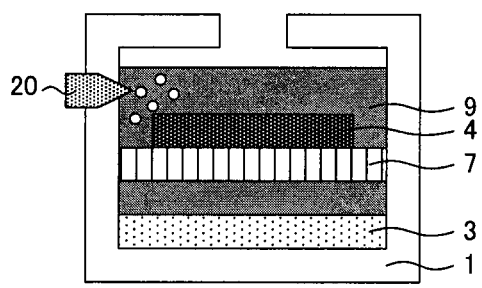
FIGS. 5A to 5C are each an explanatory view describing a positional relation between the liquid level of the liquid electrolyte and the top surface of the air cathode layer.

FIG. 5A is a schematic cross-sectional view illustrating that a position of the lowest liquid level of the liquid electrolyte is higher than a position of the top surface of the air cathode layer. In FIG. 5A, an anode layer 3, a separator 7, and an air cathode layer 4 are formed from an inside bottom surface of a battery case 1 in this order, and the lowest position of the liquid electrolyte 9 is higher than the top surface of the air cathode layer 4. Further, in FIG. 5A, an oxygen gas supply means 20 is provided such that the oxygen gas is transferred horizontally on the surface of the air cathode layer 4.

Figure 5B:
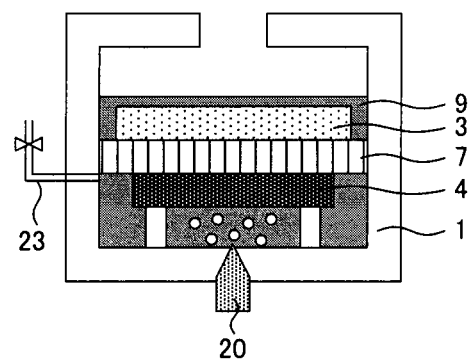

FIG. 5B is a schematic cross-sectional view illustrating that a position of the lowest liquid level of the liquid electrolyte is higher than a position of the top surface of the anode layer. In FIG. 5B, an air cathode layer 4, a separator 7, and an anode layer 3 are formed from an inside bottom surface of a battery case 1 in this order, and the lowest position of the liquid electrolyte 9 is higher than the top surface of the anode layer 3. Further, in FIG. 5B, an oxygen gas supply means 20 is provided vertically upward such that the oxygen gas is released to the surface of the air cathode layer 4. In addition, since this air battery cell has a structure where the air cathode layer is provided below the anode layer, an exhausting means 23 may be provided as needed.

Figure 5C:
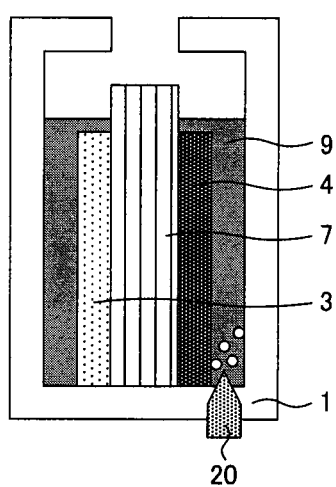

FIG. 5C is a schematic cross-sectional view illustrating that a position of the lowest liquid level of the liquid electrolyte is higher than a position of the top surface of the air cathode layer and the anode layer. In FIG. 5C, a separator 7, an anode layer 3 formed on one surface of the separator 7, and the air cathode layer 4 formed on the other surface of the separator 7 are provided, and the lowest position of the liquid electrolyte 9 is higher than the top surface of the anode layer 3 and the air cathode layer 4. Further, in FIG. 5C, an oxygen gas supply means 20 is provided vertically upward such that the oxygen gas is released to the surface of the air cathode layer 4.

In air battery systems illustrated in FIGS. 5A to 5C, all of the air battery cells are of an open type. However, the air battery system of the present invention may have an air battery cell of an encapsulated type because the system has an oxygen gas supply means. From the view point that the encapsulated type can prevent the infiltration of water, the air battery cell used in the present invention is preferably an encapsulated type air battery cell. When using an encapsulated type air battery cell, the air proof design needs to be appropriately planed or it is preferable to provide an exhausting means to an air battery cell in order to lowering the pressure inside the battery case.

In the present invention, the position of the lowest liquid level of the liquid electrolyte is preferably higher than the position of the top surface of the air cathode layer and the anode layer. A difference between the position of the lowest liquid level of the liquid electrolyte and the position of the top surface of the air cathode layer and the anode layer depends on factors such as a volume of the battery case to be used. For example, the difference is preferably within the range of 1 mm to 30 mm, and particularly preferably within the range of 3 mm to 10 mm. When the difference in heights are too small, shortage in the liquid electrolyte is easily caused due to the volatilization of the solvent or the like, and when the difference in heights are too big, supply of oxygen becomes late so that the high-rate discharge properties may be adversely affected. Further, an initial input amount of the liquid electrolyte is preferably decided to the optimal amount by preliminary measuring or calculating the change in a volume of the electrode caused by a discharge or a discharge and charge.

Moreover, a shape of the electrode body (air cathode layer, anode layer, and a separator) is not particularly restricted. As specific examples, a flat plate type, a cylindrical type, and a wound type can be cited.

(3) Provision of Oxygen Gas Supply Means

Next, a provision of an oxygen gas supply means in the present invention will be explained. In the present invention, the oxygen gas supply is supplied by bubbling to the liquid electrolyte. Thereby, it is possible to rapidly increase a density of dissolved oxygen in the liquid electrolyte even when the density of the dissolved oxygen in the liquid electrolyte is decreased by the discharge reaction. As a result, a high-rate discharge can be carried out.

A position of providing a gas releasing part of the oxygen gas supply means is not particularly limited as long as the position is a position which allows the density of the oxygen dissolved in the liquid electrolyte to increase, and an arbitrary position can be selected. In particular, in the present invention, the gas releasing part is preferably located in the vicinity of the air cathode layer. This is because a large amount of oxygen is used in the air cathode layer due to a discharge reaction. In the present invention, a distance between the gas releasing part of the oxygen gas supply means and the air cathode layer varies depending on factors such as the flow rate of the oxygen gas. For example, it is preferably within the range of 1 mm to 10 mm, and particularly preferably within the range of 2 mm to 5 mm.

As explained in the above-mentioned section "(2) Structure of Using a Large Amount of Liquid Electrolyte", the air battery cell used in the present invention may have its liquid level of the liquid electrolyte changed by the change in a volume of the electrode caused by a discharge or a discharge and charge. In such cases, it is preferable to provide the gas releasing part in a manner such that an appropriate bubbling can be conducted even at the lowest liquid level.

A direction to which the gas releasing part of the oxygen gas supply means faces is not particularly limited as long as it can increase the density of dissolved oxygen in the liquid electrolyte, and an optional direction can be selected. In particular, the direction of the gas releasing part is preferably the one at which the bubbles of the oxygen gas stay in the liquid electrolyte for a long time. As specific examples of the gas releasing part direction, the followings can be cited: a case when the gas releasing part is provided such that the oxygen gas is released to the vertically downward direction as shown in FIG. 3A; a case when the gas releasing part is provided such that the oxygen gas is released to the horizontal direction as shown in FIG. 5A; and a case when the gas releasing part is provided such that the oxygen gas is released to the vertically upward direction as shown in FIGS. 5B and 5C.

In the present invention, the oxygen gas may be supplied to the liquid electrolyte inside or outside of the air battery cell. As explained, when the air battery cell is an air battery cell which constantly fills the air cathode layer and the anode layer by circulating the liquid electrolyte, the oxygen gas supply means may be provided in a circulating zone for circulating the liquid electrolyte. By providing the oxygen gas supply means outside of the air battery cell, it is possible to downsize the air battery cell. The phrase "circulating zone" denotes a zone outside of the air battery cell and a zone used for circulating the liquid electrolyte.

Figure 6:
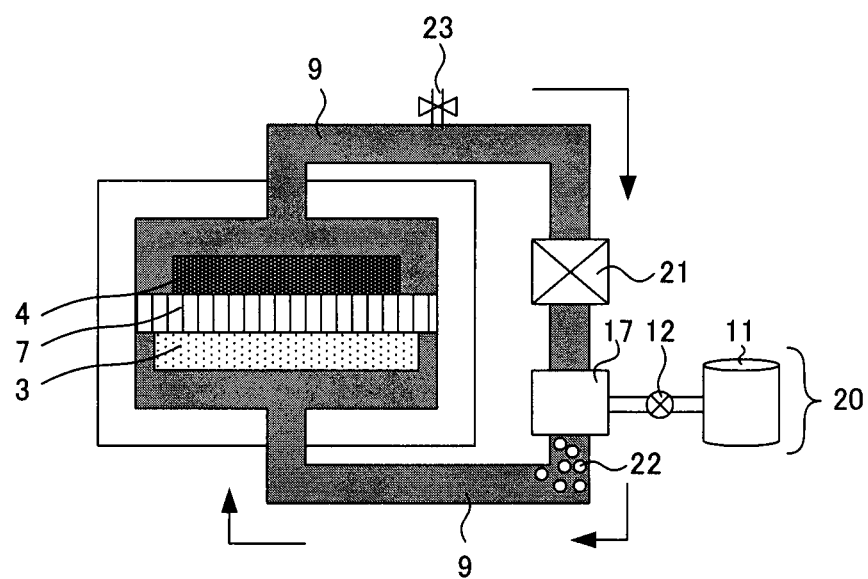
FIG. 6 is an explanatory view describing one embodiment of the air battery system of the present invention.

As a specific example of an air battery system in which oxygen is supplied in such circulating zone, an air battery system shown in FIG. 6 can be cited. The air battery system of FIG. 6 is an air battery system, wherein a liquid electrolyte 9 is circulated between an anode layer 3, a separator 7, and an air cathode layer 4 in this order using a liquid electrolyte transferring means 21 such as a motor, and wherein the system comprises an oxygen gas supply means 20 having a bubble generator 17, a solenoid valve 12 and an oxygen gas storage part 11 is provided at the downstream side of the liquid electrolyte transferring means 21. The air battery system illustrated in FIG. 6 is to supply an oxygen gas to the liquid electrolyte outside of the air battery cell. However, an oxygen gas may be supplied to the liquid electrolyte inside of the air battery cell as shown in FIG. 4.

Figure 7:
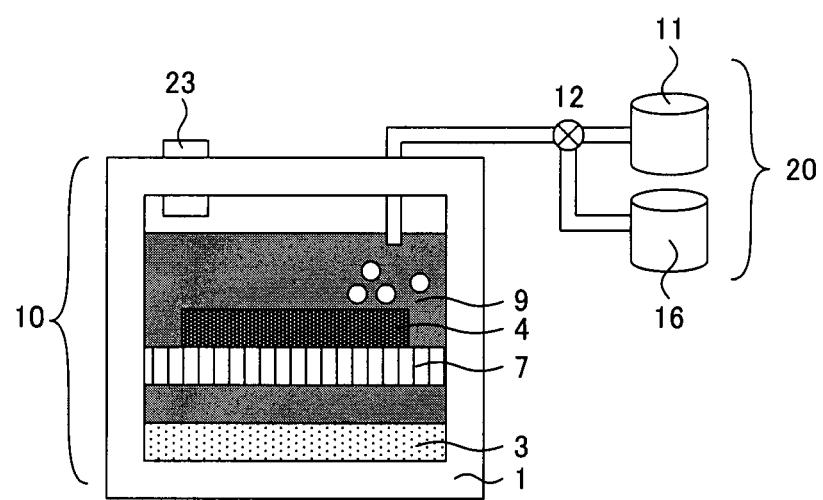
FIG. 7 is an explanatory view describing one embodiment of the air battery system of the present invention.

Further, the oxygen gas supply means used in the present invention may also have the above-mentioned function of inert gas supply means. As a specific example, as shown in FIG. 7, an air battery system, wherein an oxygen gas supply means 20 has an oxygen gas storage part 11 and an inert gas storage part 16, and the oxygen gas or inert gas can be used by switching a solenoid valve 12. The air battery system illustrated in FIG. 7 uses an encapsulated type air battery cell 10 and comprises an exhausting means 23 for lowering the pressure inside the battery case 1.

The oxygen gas supply means used in the present invention may have one or plural gas releasing parts. Further, in the present invention, the oxygen gas supply means and the inert gas supply means may be provided separately.

(4) Provision of Inert Gas Supply Means

Next, a provision of an inert gas supply means in the present invention will be explained. In the present invention, the inert gas supply is supplied by bubbling to the liquid electrolyte. Thereby, it is possible to decrease a density of dissolved oxygen in the liquid electrolyte even when the density of the dissolved oxygen in the liquid electrolyte is increased by the charge reaction. As a result, a high-rate charge can be carried out.

A position to provide the inert gas supply means is not particularly limited as long as it is a position which can lower the density of oxygen dissolved in the liquid electrolyte, and an arbitrary position can be selected. In particular, in the present invention, the gas releasing part is provided preferably in the vicinity of the air cathode layer. This is because, a large amount of oxygen is generated in the air cathode layer by a charging reaction. The distance between the gas releasing part and the air cathode layer of the inert gas supply means, the direction of gas releasing part of the inert gas supply means, and the circulating zone are the same to those explained in the above-mentioned section of "(3) Provision of Oxygen Gas Supply Means", and thus, explanations here are omitted.

B. Control Method of Air Battery Cell

First, a control method of an air battery cell for the present invention will be explained. The control method of an air battery cell of the present invention uses an air battery cell which contains an air cathode, an anode, and a separator, characterized in that the air cathode further contains an air cathode layer containing a conductive material, and an air cathode current collector for collecting current of the air cathode layer; the anode further contains an anode layer containing an anode active material which stores and releases a metal ion, and an anode current collector for collecting current of the anode layer; and the separator is provided between the air cathode layer and the anode layer, and characterized in that the air cathode layer and the anode layer are constantly filled with a liquid electrolyte at a time of a change in a volume of the electrode caused by a discharge or a discharge and charge, and further characterized in that an oxygen gas is supplied by bubbling to the liquid electrolyte at the discharge.

According to the present invention, since the oxygen gas is directly supplied by bubbling to the liquid electrolyte, it is possible to rapidly increase a density of dissolved oxygen in the liquid electrolyte, and a high-rate discharge can be carried out.

When the air battery cell used in the present invention is a secondary battery, it is preferable to stop the supply of the oxygen gas at the time of charge. Thereby, the density of dissolved oxygen in the liquid electrolyte is prevented from increasing and the charging reaction is smoothly progressed. Further, when the air battery cell used is an air battery cell whose air cathode layer and anode layer are constantly filled with a liquid electrolyte by circulating the liquid electrolyte, it is possible to efficiently remove oxygen caused by the charging reaction from the air cathode layer by circulating the liquid electrolyte without supplying the oxygen gas.

Further, in the present invention, it is preferable to supply the inert gas to the liquid electrolyte at a time of a charge. Thereby, it is possible to decrease the density of the dissolved oxygen in the liquid electrolyte even when the density of the dissolved oxygen in the liquid electrolyte increases according to a charging reaction. As a result, the high-rate charge can be carried out.

As the air battery cell, the means of supplying the oxygen gas and the inert gas to the liquid electrolyte, and other factors of the present invention are the same as those explained in the above-mentioned section "A. Air Battery System", explanations here are omitted.

The present invention is not limited to the above-mentioned embodiments. The above embodiments are mere illustrative, and the present invention encompasses any embodiments that have substantially the same constitution and exhibit the same working effect as the technical idea described in the claims in the present application.

EXAMPLES

Hereinafter, the present invention will be further specifically explained by ways of the following examples.

Example 1

The present example will be explained with reference to FIG. 1A. Assembling of the following cell was conducted in an argon box. First, an air cathode current collector 2 was provided in the inside of a lower insulating case 1a, and the air cathode current collector 2 was jointed to an anode lead 2'. The anode lead 2' ran through the lower insulating case 1a and penetrated to the outside. Next, an anode layer 3 was provided on the air cathode current collector 2. Then, an air cathode current collector 6 was provided in the middle of the lower insulating case 1a, and the air cathode current collector 6 was jointed to an air cathode lead 6'. The air cathode lead 6' ran through the lower insulating case 1a and penetrated to the outside. Further next, a separator 7 was provided in the upper middle of the lower insulating case 1a, and an air cathode mesh 5 and an air cathode layer 4 were provided thereon.

The inner side of the lower insulating case 1a was threaded and could be connected with the screw cutting made outside of upper insulating case 1b. The upper insulating case 1b could be fixed by sandwiching the separator 7 and the air cathode mesh 5 with the lower insulating case 1a via a gasket. At this time, since the air cathode mesh 5 had a larger diameter than that of the separator 7, the air cathode mesh 5 and the air cathode current collector 6 contacted each other at the outside of the separator 7. Next, a liquid electrolyte 9 was injected between the lower insulating case 1a and the upper insulating case 1b. The liquid electrolyte 9 was injected until an air cathode layer 4 was completely dipped when the cell was provided horizontally. Further next, the anode lead 2' was connected to a negative terminal and the air cathode lead 6' was connected to a positive terminal.

Next, a gas injecting hose (oxygen gas supply means 20) was provided in such a manner that it penetrated the upper insulating case 1b and was fixed with a fixing screw 14. The oxygen gas supply means 20 comprised an oxygen gas storage part 11, a solenoid valve 12a, a pressure pump 13, and a solenoid valve 12b. Further, in this air battery system, the solenoid valves 12a and 12b opened at the starting of a discharge, the pressure pump 13 was activated to send a gas from the oxygen gas storage tank 11. The air battery system was designed to close the solenoid valves 12a and 12b, and to stop the pressure pump 13 when the discharge was completed.

Example 2

The present example will be explained with reference to FIG. 2. Assembling of the following cell was conducted in an argon box. First, a nickel mesh (thickness 150 μm, diameter 40 mm) was provided as an air cathode current collector 2 at the inside of a lower insulating case 1a made of Teflon (Registered Trademark) and having a diameter of 80 mm, and the air cathode current collector 2 was jointed to an anode lead 2' (made of nickel). The anode lead 2' ran through the lower insulating case 1a and penetrated to the outside. Next, an anode layer 3 was provided on the air cathode current collector 2. The anode layer 3 was a metal lithium foil and a foil having a thickness of 250 μm punched out and processed to a layer having a diameter of 20 mm was used. This anode layer 3 was pressure bonded to the mesh of the air cathode current collector 2. Then, a separator 7 (made of polyethylene, thickness 25 μm, diameter 60 mm) was provided in the upper middle of the lower insulating case 1a, and an air cathode mesh 5 (made of nickel, thickness 150 μm, diameter 60 mm) and an air cathode layer 4 were provided thereon. The air cathode layer 4 used was prepared by kneading 80 weight parts of Ketjen Black and 10 parts by weight of manganese dioxide in an agate mortar, then adding 10 parts by weight of polytetrafluoroethane (PTFE), and further kneading the resultant. The air cathode layer 4 was processed to have a diameter of 16 mm and then pressed to the center part of the air cathode mesh 5 to be pressure bonded thereto.

The inner side of the lower insulating case 1a was threaded and could be connected with the screw cutting made outside of upper insulating case 1b (made of Teflon (Registered Trademark), outside diameter 60 mm). At the tip of the upper insulating case 1b, a current collector made of nickel (thickness 2 mm) was attached as an air cathode current collector 6 and was further connected to an air cathode lead 6'. The upper insulating case 1b could be fixed by sandwiching the separator 7 and the air cathode mesh 5 with the lower insulating case 1a. At this time, the air cathode current collector 6 and the air cathode mesh 5 were provided to contact each other. Next, a liquid electrolyte 9 (prepared by using a mixed solvent of 30 parts by volume of ethylene carbonate and 70 parts by volume of ethyl methyl carbonate as a solvent, and mixing into the solvent 1 molecular volume of $LiPF_6$ as an electrolyte salt) was injected between the lower insulating case 1a and the upper insulating case 1b. The liquid electrolyte 9 was injected up to the height 5 mm up of the air cathode layer 4 when the cell was provided horizontally, and the air cathode layer 4 was completely dipped. Further next, the anode lead 2' was connected to a negative terminal and the air cathode lead 6' was connected to a positive terminal.

Next, a gas injecting hose (oxygen gas supply means 20, a tube made of Teflon (Registered Trademark) and having an outside diameter of 6.4 mm) was provided in such a manner that it penetrated the upper insulating case 1*b* and was fixed with a fixing screw 14. The oxygen gas supply means 20 comprised an oxygen gas storage part 11, a solenoid valve 12*a*, a pressure pump 13, and a solenoid valve 12*b*. Further, in this air battery system, the solenoid valves 12*a* and 12*b* opened at the starting of a discharge, the pressure pump 13 was activated to send a gas from the oxygen gas storage tank 11. The air battery system was designed to close the solenoid valves 12*a* and 12*b*, and to stop the pressure pump 13 when the discharge was completed.

The invention claimed is:

1. An air battery system comprising:
    an air battery cell which contains an air cathode, an anode, and a separator;
    an oxygen gas supply means for supplying an oxygen gas by bubbling to a nonaqueous liquid electrolyte; and
    an inert gas supply means for supplying an inert gas by bubbling to the nonaqueous liquid electrolyte,
    wherein the air cathode further contains an air cathode layer containing a conductive material, and an air cathode current collector for collecting current of the air cathode layer; the anode further contains an anode layer containing an anode active material which stores and releases a metal ion, and an anode current collector for collecting current of the anode layer; and the separator is provided between the air cathode layer and the anode layer,
    wherein the air cathode layer and the anode layer are constantly filled with the nonaqueous liquid electrolyte at a time of a change in a volume of the electrode caused by a discharge or a discharge and charge, and
    wherein a metallic oxide is generated at the air cathode at the time of discharge.

2. The air battery system according to claim 1, wherein the air battery cell is an air battery cell whose air cathode layer and anode layer are constantly filled with the nonaqueous liquid electrolyte by circulating the nonaqueous liquid electrolyte.

3. The air battery system according to claim 2, wherein the oxygen gas supply means is provided in a circulating zone for circulating the nonaqueous liquid electrolyte.

4. The air battery system according to claim 1, wherein, when a height of a liquid level of the nonaqueous liquid electrolyte changes by the change in a volume of the electrode caused by the discharge or the discharge and charge, a position of a lowest liquid level of the nonaqueous liquid electrolyte is higher than a position of a top surface of the air cathode layer and the anode layer.

5. A control method of an air battery cell using an air battery cell which contains an air cathode, an anode, and a separator,
    wherein the air cathode further contains an air cathode layer containing a conductive material, and an air cathode current collector for collecting current of the air cathode layer; the anode further contains an anode layer containing an anode active material which stores and releases a metal ion, and an anode current collector for collecting current of the anode layer; and the separator is provided between the air cathode layer and the anode layer,
    wherein the air cathode layer and the anode layer are constantly filled with a nonaqueous liquid electrolyte at a time of a change in a volume of the electrode caused by a discharge or a discharge and charge,
    wherein an oxygen gas is supplied by bubbling to the nonaqueous liquid electrolyte at the discharge,
    wherein an inert gas is supplied by bubbling to the nonaqueous liquid electrolyte at the charge, and
    wherein a metallic oxide is generated at the air cathode at the time of discharge.

* * * * *